(12) United States Patent
David et al.

(10) Patent No.: US 11,201,412 B2
(45) Date of Patent: Dec. 14, 2021

(54) RADIO FREQUENCY REFLECT-ARRAY SINGLE PANEL FOR SATELLITE ANTENNA AND AN ASSEMBLY OF RADIO FREQUENCY REFLECT-ARRAY PANELS FOR SATELLITE ANTENNA COMPRISING AT LEAST ONE SUCH PANEL

(71) Applicant: THALES, Courbevoie (FR)

(72) Inventors: Jean-François David, Toulouse (FR); Renaud Chiniard, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/556,035

(22) Filed: Aug. 29, 2019

(65) Prior Publication Data
US 2020/0091613 A1 Mar. 19, 2020

(30) Foreign Application Priority Data
Sep. 13, 2018 (FR) ...................... 1800957

(51) Int. Cl.
  *H01Q 15/14* (2006.01)
  *H04B 7/185* (2006.01)

(52) U.S. Cl.
  CPC .......... *H01Q 15/141* (2013.01); *H01Q 15/14* (2013.01); *H04B 7/18515* (2013.01)

(58) Field of Classification Search
  CPC .......... H01Q 1/14; H01Q 1/141; H01Q 1/27; H01Q 1/28; H01Q 1/288; H04B 7/14; H04B 7/15; H04B 7/185; H04B 7/1851; H04B 7/18513; H04B 7/18515
  See application file for complete search history.

(56) References Cited

U.S. PATENT DOCUMENTS

| | | | | |
|---|---|---|---|---|
| 5,666,128 A | * | 9/1997 | Murray | H01Q 21/0087 343/878 |
| 7,889,147 B2 | * | 2/2011 | Tam | H01Q 21/0025 343/777 |
| 8,757,554 B1 | * | 6/2014 | Harvey | B64G 1/44 244/172.9 |
| 10,658,758 B2 | * | 5/2020 | Hafenrichter | H01Q 21/0087 |
| 2005/0219146 A1 | * | 10/2005 | Judasz | H01Q 15/0033 343/912 |
| 2009/0115680 A1 | | 5/2009 | Chang | |
| 2010/0045563 A1 | * | 2/2010 | Thompson | H01Q 15/14 343/881 |
| 2010/0066631 A1 | * | 3/2010 | Puzella | H01Q 21/0087 343/853 |
| 2012/0193015 A1 | * | 8/2012 | Segal | C09J 5/00 156/182 |

(Continued)

FOREIGN PATENT DOCUMENTS

| | | |
|---|---|---|
| CN | 101 872 905 A | 10/2010 |
| CN | 106 486 734 A | 3/2017 |

*Primary Examiner* — Jason Crawford
(74) *Attorney, Agent, or Firm* — BakerHostetler

(57) ABSTRACT

A radio frequency reflect-array panel for satellite antenna, includes a structural support; radio frequency tiles supporting polygonal radio frequency cells configured to reflect and phase-shift incident radio frequency signals; a complete link, between the structural support and the radio frequency tile; and at least two runner-type links, between the structural support and the radio frequency tile, in the plane of the panel, of distinct axes and passing through the complete link.

14 Claims, 7 Drawing Sheets

(56) References Cited

U.S. PATENT DOCUMENTS

| | | | | |
|---|---|---|---|---|
| 2013/0278474 | A1* | 10/2013 | Lenormand | H01Q 13/22 343/756 |
| 2017/0346176 | A1* | 11/2017 | Linn | H01Q 21/064 |
| 2018/0166781 | A1 | 6/2018 | Snyder et al. | |

* cited by examiner

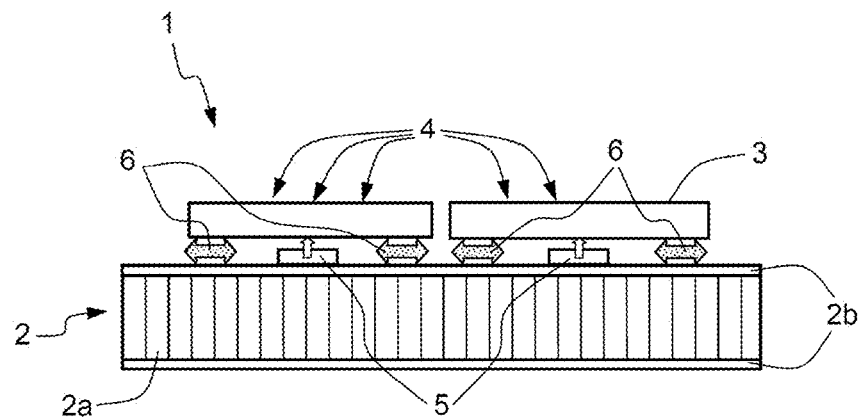
FIG.3
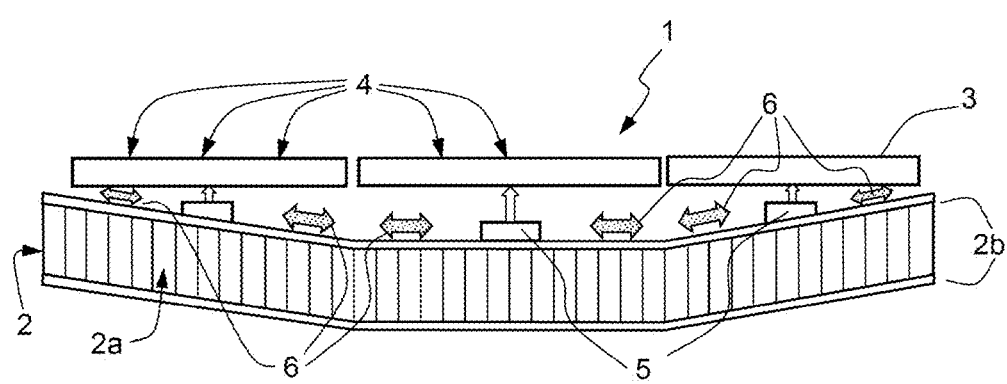
FIG.3 bis
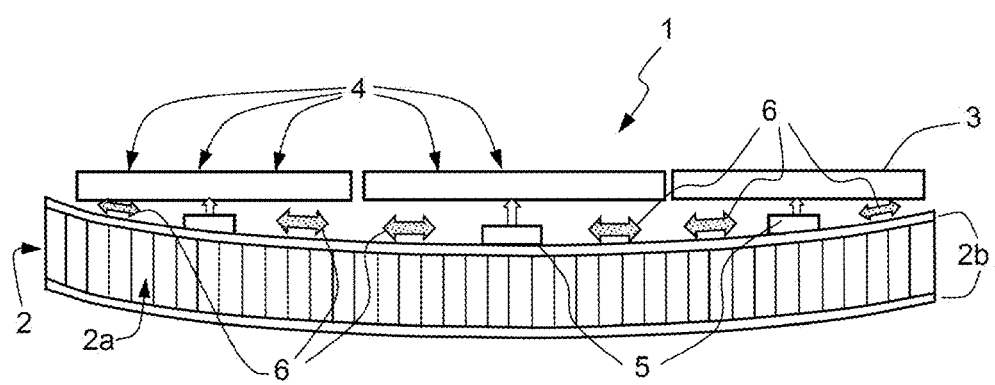
FIG.3 ter

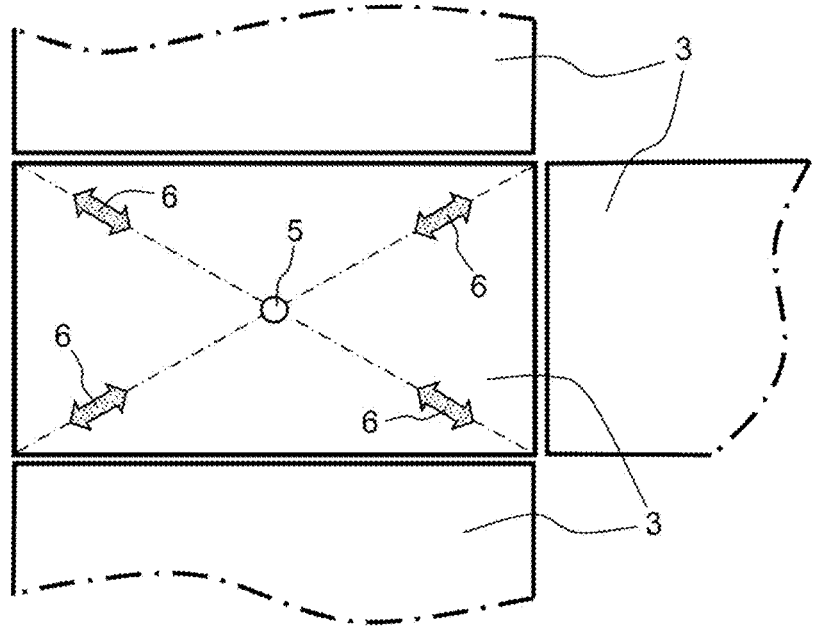
FIG.7
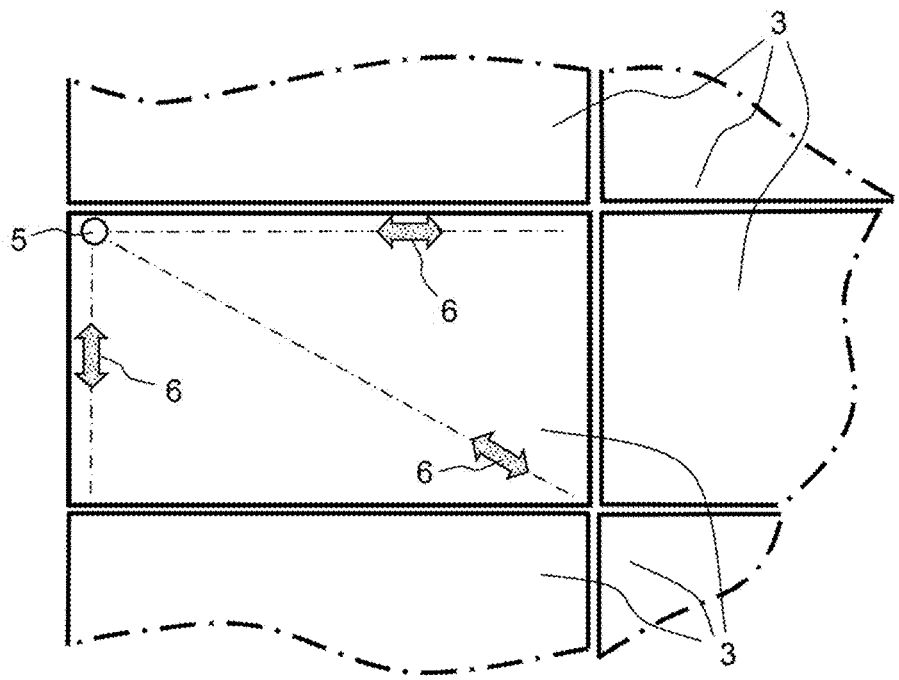
FIG.7 bis

RADIO FREQUENCY REFLECT-ARRAY SINGLE PANEL FOR SATELLITE ANTENNA AND AN ASSEMBLY OF RADIO FREQUENCY REFLECT-ARRAY PANELS FOR SATELLITE ANTENNA COMPRISING AT LEAST ONE SUCH PANEL

CROSS-REFERENCE TO RELATED APPLICATIONS

This application claims priority to foreign French patent application No. FR 1800957, filed on Sep. 13, 2018, the disclosure of which is incorporated by reference in its entirety.

FIELD OF THE INVENTION

The invention relates to a radio frequency reflect-array single panel for satellite antenna and an assembly of radio frequency reflect-array panels for satellite antenna comprising at least one such panel.

BACKGROUND

Radio frequency reflectors are known for parabolic satellite antennas of large sizes, for example of the order of 6 m diameter, which are technically complicated and therefore of high cost to satisfy the functional requirements demanded by the mission (particularly with respect to the geometrical stability in orbit).

Reflective array panels are known, such as those embedded on the "cubesat" satellite, called "Integrated Solar Array and Reflectarray Antenna", of acronym ISARA, as illustrated in FIG. 1.

Also known are demonstrators or prototypes produced on the ground operating in the bands L to C.

However, the planar panels of the state of the art pose a problem of thermal expansion when they have to operate at radio frequencies, given the thermal gradients that exist along such external appendages.

Because of its RF operation, a configuration using a panel of reflectarray type demands a rigorous selection of dielectric materials with low RF losses and low permittivity.

Thus, the materials that are possible in bands L to C are naturally oriented to laminates with organic matrices (for example of ester cyanate, polyimide or equivalent type) reinforced by quartz, silica or glass fibres. These materials are indeed efficient in RF mode, but remain unstable with respect to their coefficient of thermal expansion (of the order of 10, or even 12 ppm/° C.) for temperature variations that are observed in orbit.

This range of coefficients of thermal expansion appears too great to guarantee the level of geometrical stability required for a reflectarray product, in order to ensure the antenna demands imposed by the telecom operators.

The transverse thermal gradients (outside of the plane of the thickness of the reflectarray panel) induce, through "dual blade effect" of the panel, deformations outside of the plane that are significant, as illustrated in FIG. 2.

Dual blade effect is understood to mean the coupling between expansions in the plane and expansions outside of the plane (by membrane/bending coupling) subsequent to strong coefficients of expansion.

SUMMARY OF THE INVENTION

One aim of the invention is to mitigate the problems mentioned above, and in particular for panels of dimensions greater than 2 m by 2 m.

There is proposed, according to one aspect of the invention, a radio frequency reflective array panel for satellite antenna, comprising:
- a structural support;
- radio frequency tiles supporting polygonal radio frequency cells configured to reflect and phase-shift incident radio frequency signals;
- a complete link (called fixed point), between the structural support and the radio frequency tile; and
- at least two runner-type links, between the structural support and the radio frequency tile, in the plane of the panel, of distinct axes and passing through the complete link.

Such a panel exhibits limited expansions and therefore expansions that are compatible with the mission requirements of satellites.

In one embodiment, the complete link can be disposed at the barycentre of the radio frequency tile.

Thus, the deformations in the plane of the RF tile, under thermal loading, are minimized, which offers a certain advantage for antenna performance levels.

As a variant: the complete link can be disposed at the edge of the radio frequency tile.

Thus, that can facilitate certain RF tile configurations (local layout constraints), but, on the other hand, will induce deformations in the plane that are greater (compared to the complete link located at the centre of the RF tile), therefore with antenna performance levels more impacted by the thermal loading.

According to one embodiment, the structural support comprises a spacer layer coated with two skins of draped orthotropic material, less than 1 mm thick, configured to ensure a quasi-isotropic equivalent Young's modulus lying between 100 and 200 GPa, and a coefficient of thermal expansion less than or equal to 3 ppm/° C.

Thus, it is possible to ensure the dimensional stability required by the mission, and do so despite the available coefficients of thermal expansion (or CTE) that are high for the constituent dielectric materials of a radio frequency tile. Indeed, without the invention, only CTEs less than or equal to 3 ppm/° C. would make it possible to guarantee this level of dimensional stability in orbit. Such CTE values remain, for the time being, commercially unavailable. The fixing device for a radio frequency tile makes it possible to limit the dual blade effect by prohibiting the deformations out of the plane of the RF tile, through flanging effect on the structural panel. Thus, the deformations out of the plane remain limited to that of the structural panel, that is to say equivalent to those obtained by a CTE equivalent to 3 ppm/° C.

In one embodiment, the spacer layer is made of in the form of a honeycomb core, and/or in the form of an assembly of bars, and/or made of foam.

Thus, the spacer layer ensures a necessary rigidity, with a sufficiently limited density.

According to one embodiment, the RF stage of the radio frequency cells (4) comprises a stacking of a supporting dielectric layer, covered with a stable layer that is insulating to radio frequencies within an extended range of temperatures lying between −130° C. and +150° C., such as a laminate of polyimide type, such as Kapton (registered trademark).

In one embodiment, the RF stage of the radio frequency cells comprises a partial copper layer, ensuring the radio frequency phase-shifting, disposed between the supporting dielectric layer and the layer that is insulating to radio frequencies, or on the layer that is insulating to radio frequencies.

According to one embodiment, the radio frequency cells have a reduced thickness of between 5 and 10 mm for the case of the frequency band S.

Thus, the weight supported by the structural support remains limited.

In one embodiment, a complete link (also called fixed point) comprises:
a screw;
a tapped insert in the radio frequency tile;
a tapped insert in the structural support;
a shouldered spacer to ensure a spacing between the radio frequency tile and the structural support and a centring of the elements of the complete link, and provided with a bore for the screw; and
a washer between the head of the screw and the insert in the planar support.

Thus, the direction of the slips in the plane appears to be controlled and the direction of the slips out of the plane remains constricted.

According to one embodiment, a runner-type link comprises:
a screw;
a tapped insert in the radio frequency tile;
a tapped insert in the structural support;
a shouldered spacer ensuring a spacing between the radio frequency tile and the structural support and a centring of the elements of the runner-type link, and provided with a bore for the screw;
a spring washer between the spacer and the insert in the support to calibrate the effort exerted by the screw; and
an oblong hole allowing a sliding zone for the screw, between the spacer and the tapped insert, along the axis of the runner-type link.

Thus, the direction of the slips in the plane appears to be controlled and the direction of the slips out of the plane remains constricted.

In one embodiment, a runner-type link (6) comprises:
an "I" beam ensuring a spacing between the radio frequency tile and the structural support, comprising a bottom flange, a web and a top flange with tapping;
a layer of glue fixing the bottom flange to the structural support;
an insert in the tile, with bore;
a screw; and
a washer between the head of the screw and the insert in the radio frequency tile.

Thus, the direction of the slips in the plane appears to be controlled and the direction of the slips out of the plane remains constricted.

According to one embodiment, a runner-type link comprises:
a runner;
a layer of glue fixing the runner to the structural support;
an "I" beam ensuring a spacing between the radio frequency tile and the structural support, comprising a bottom flange forming a slide in the runner, a web and a top flange with tapping;
an insert in the radio frequency tile, with bore;
a screw; and
a washer between the head of the screw and the insert in the radio frequency tile.

Thus, the direction of the slips in the plane appears to be controlled and the direction of the slips out of the plane remains constricted.

According to another aspect of the invention, there is also proposed a radio frequency reflective array for satellite antenna comprising at least one panel according to one of the preceding claims, and assembly and deployment mechanisms.

BRIEF DESCRIPTION OF THE DRAWINGS

The invention will be better understood on studying a few embodiments described as nonlimiting examples and illustrated by the attached drawings in which:

FIG. 3 schematically illustrates a radio frequency reflective array panel for satellite antenna, according to one aspect of the invention;

FIG. 3*bis* schematically illustrates a variant of FIG. 3, in which the structural support is facetted, according to one aspect of the invention;

FIG. 3*ter* schematically illustrates a variant of FIG. 3, in which the structural support is convex, according to one aspect of the invention;

FIG. 7 schematically illustrates a mode of fixing of a rectangular radio frequency tile onto its structural panel, substantially at the barycentre of the tile, according to one aspect of the invention;

FIG. 7*bis* schematically illustrates a mode of fixing of a rectangular radio frequency tile onto its structural panel, on an edge of the tile, according to one aspect of the invention;

Figure 1:
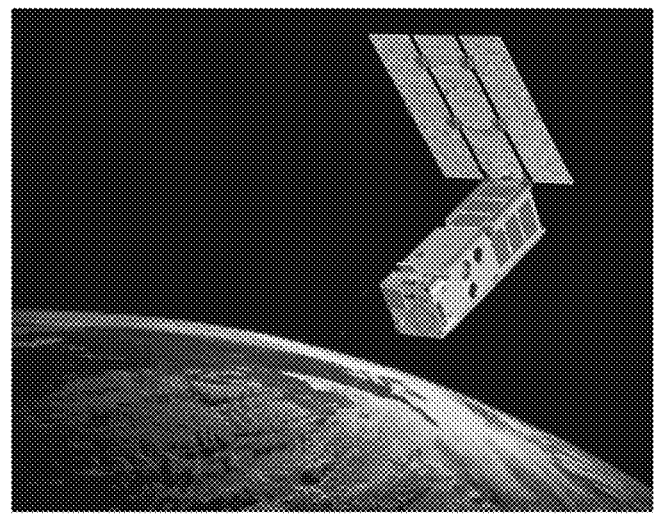
FIG. 1 schematically represents reflective array panels of ISARA type, according to the state of the art.
Figure 2:
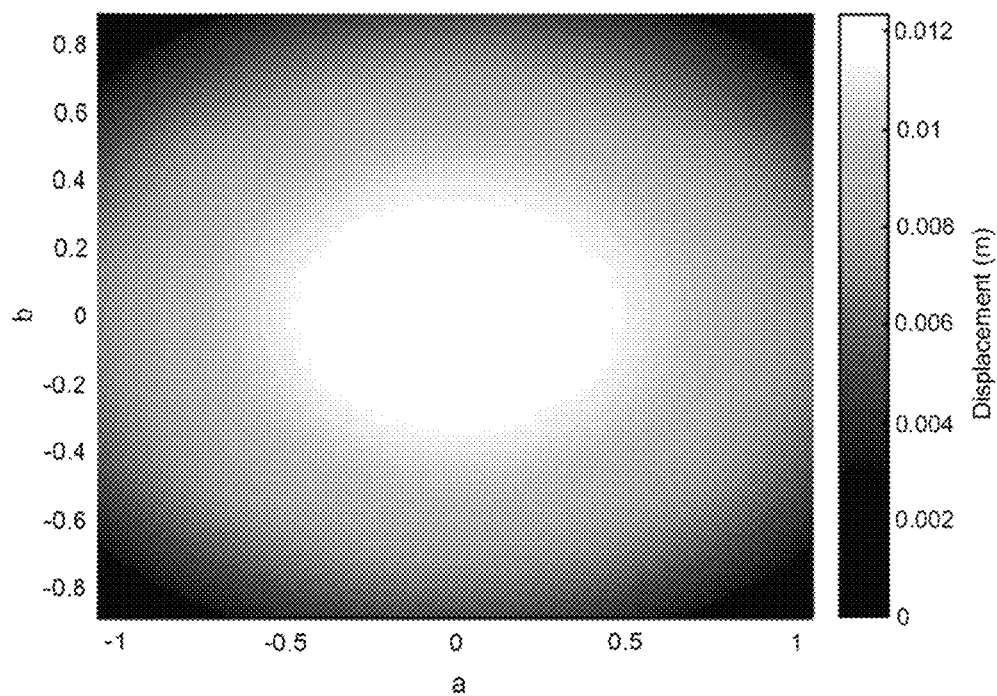
FIG. 2 schematically illustrates the displacements out of the plane in the presence of transverse thermal gradients transversal to the thickness of the reflect-array panel, according to the state of the art.

Throughout the figures, the elements that have identical references are similar.

DETAILED DESCRIPTION

FIG. 3 represents a radio frequency reflective array panel 1 according to one aspect of the invention, in cross section, comprising:
a structural support 2;
radio frequency tiles 3 supporting polygonal radio frequency cells 4 configured to reflect and phase-shift incident radio frequency signals;

a complete link 5, between the structural support 2 and the radio frequency tile 3; and at least two runner-type links 6, between the structural support 2 and the radio frequency tile 3, in the plane of the panel 1, of distinct axes and passing through the complete link 5.

The complete link 5 can be situated at the middle of a tile or at the edge of a tile.

The structural support 2 comprises a spacer layer 2a coated with two skins 2b of draped orthotropic material, less than 1 mm thick, configured to ensure a quasi-isotropic equivalent Young's modulus lying between 100 and 200 GPa, and a coefficient of thermal expansion less than or equal to 3 ppm/° C.

Structural support 2 is understood to mean a support ensuring the functions of overall stiffness of the reflect-array product both in stowed configuration and in deployed configuration, the passage of the efforts at the fixing of the panels onto the platform, the fixing of the deployment hinges between reflectarray panels, and the fixing of the RF tiles.

The structural support 2 can be planar or not, for example it can be facetted or convex, as respectively illustrated in FIG. 3bis and 3ter.

The spacer layer 2a can be made of honeycomb, core and/or in the form of an assembly of bars, and/or made of foam.

The stage of the radio frequency cells 4, or in other words the set of the RF tiles, comprises a stacking of a supporting dielectric layer, covered with a stable layer that is insulating to radio frequencies within an extended range of temperatures lying between −130° C. and +150° C. This insulating layer is ensured for example by a layer of Kapton (registered trademark) corresponding to a laminate of polyimide type.

A cell 4 can comprise a partial copper layer, ensuring the radio frequency phase-shifting, contained disposed between the supporting dielectric layer and the layer that is insulating to radio frequencies, or on the layer that is insulating to radio frequencies.

The radio frequency cells have a reduced thickness of between 5 and 10 mm in band S, which makes it possible to limit the supported mass by the structural support 2 of the panel 1.

Improving such radio frequency cells demands rebuilding its own data base making it possible to ensure the RF synthesis of the reflect-array panel 1. Cells must be chosen that are suited to the local phase-shifting to be performed, and a choice must be made between capacitive or inductive design.

Figure 4:
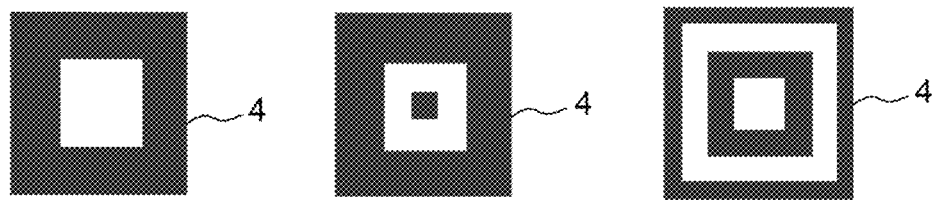
FIG. 4 schematically illustrates examples of radio frequency cells with capacitive or inductive operation, according to one aspect of the invention.

FIG. 4 schematically represents radio frequency cells with capacitive operation, of order 1, of order 2 and of order 3.

Figure 5:
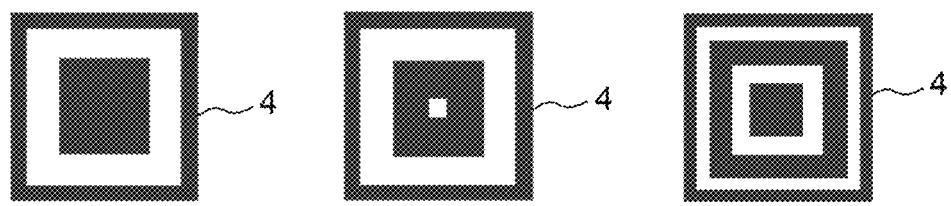
FIG. 5 schematically illustrates examples of radio frequency cells with capacitive or inductive operation, according to one aspect of the invention.

FIG. 5 schematically represents radio frequency cells with inductive operation, of order 1, of order 2 and of order 3.

Such a radio frequency cell 4, of unusual thickness, ensures an operation with an RF stage $\lambda/8$ thick, whereas the state of the RF art retains a minimum thickness of $\lambda/4$, $\lambda$ representing the wavelength.

The main advantage of this artifice lies in the induced weight reduction of the panel 1, just like its increased compactness in stowed (i.e. non-deployed) configuration making it compatible with a shrouded volume up to opening diameters of 6 m to 7 m.

Figure 6:
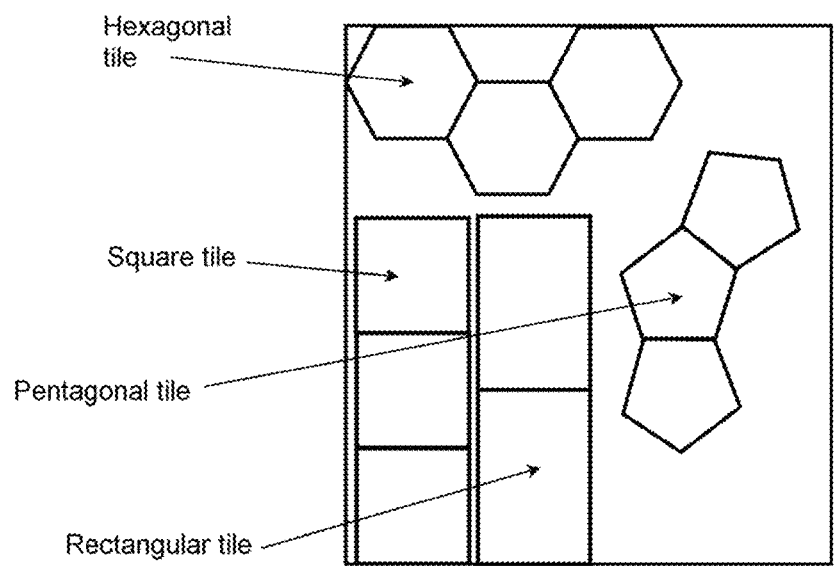
FIG. 6 schematically illustrates examples of possible forms of radio frequency tiles, according to one aspect of the invention.

FIG. 6 schematically represents various forms of radio frequency tiles 3 in polygon forms, in this particular case in the form of regular polygons, such as square tiles, rectangular tiles, tiles in the form of regular pentagons, or hexagonal tiles.

The cutting of such tiles is done so as to limit the RF impacts, while reconciling in particular the following functional requirements:

manufacturing tolerances of a radio frequency (RF) tile, and inter-tile play needed during the assembly of the structural panel;

avoiding RF zones neutralized by unavoidable non-RF functions: fixing of the HRMs (ensuring the fixing of the assembly of the reflect-array panels on the platform in the launch phase), fixing of the inter-panel 1 fittings, fixing of the thermal screen (element ensuring the passive thermal control of the reflective panel on its front face) or "sunshield" covering the active face of the pane 1;

minimizing of the manufacturing deformations of an elementary RF tile 3;

minimizing of the deformations in orbit under loading of transverse thermal gradient type, given the transfer system considered between an RF tile 3 and the structural support 2.

The arrangement of the RF stage is subdivided into separate tiles 3 in order to mitigate an inadequate intrinsic geometrical stability (remaining controlled by the high CTEs of the constituent dielectric materials).

FIG. 7 schematically illustrates a rectangular radio frequency tile, according to one aspect of the invention, with the complete link (called fixed point) 5 and at the barycentre of the tile 3. It comprises four contributing runner-type links 6 in the plane of the panel 1, and for example along the diagonals of the rectangular RF tile 3.

The complete link 5 can be ensured by gluing or any other form of mechanical fixing based on screws, rivets, etc.

The runner-type links 6 can be ensured by flexible gluing (silicone glue or equivalent), or by any other device ensuring a free translation radially in the plane of the tile 3.

FIG. 7bis illustrates a variant of FIG. 7, in which the complete link (called fixed point) 5 is disposed on the edge of the tile 3, for example in a corner for a rectangular radio frequency tile. Such a tile 3 comprises three runner-type links 6, for example disposed as in Figure Ibis.

Figure 8:
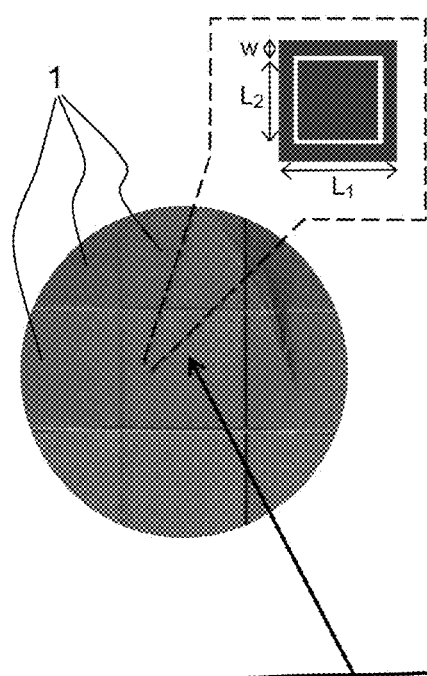
FIGS. 8 and 9 schematically illustrate square radio frequency cells and the overall deformations of the reflect-array product in multi-panel version, in the case of transverse thermal loading, according to one aspect of the invention.

FIG. 8 schematically represents a reflect-array product produced by an assembly of panels 1 deployed such that the overall form offered by the opening as closely as possible approximates the mother parabola of the equivalent reflector of the antenna.

Each of the panels 1 (in this case 9 of them for an antenna of 6 m aperture), is equipped with RF tiles (for example 16 of them) such that the deformations in orbit remain controlled by the supporting structural panel (each of the RF tiles then sees its expansions outside of the plane constricted by the proposed device, whereas the overall deformations at the level of the structural panel typically of 2 m×2 m remain small through the architecture retained therefor (associated with a discerning choice of materials implemented: for example CFRP skins (carbon fibres impregnated with organic resin) with low CTE)). Thus, the deformations outside of the plane that are intrinsic to the RF tile (of dual blade type induced by the transverse thermal gradients) are limited to those of the supporting panel (that is to say compatible with the antenna mission (in band S, the aim is to keep the deformations at the plane level less than 3 mm, and in the plane less than 3 mm)).

Figure 9:
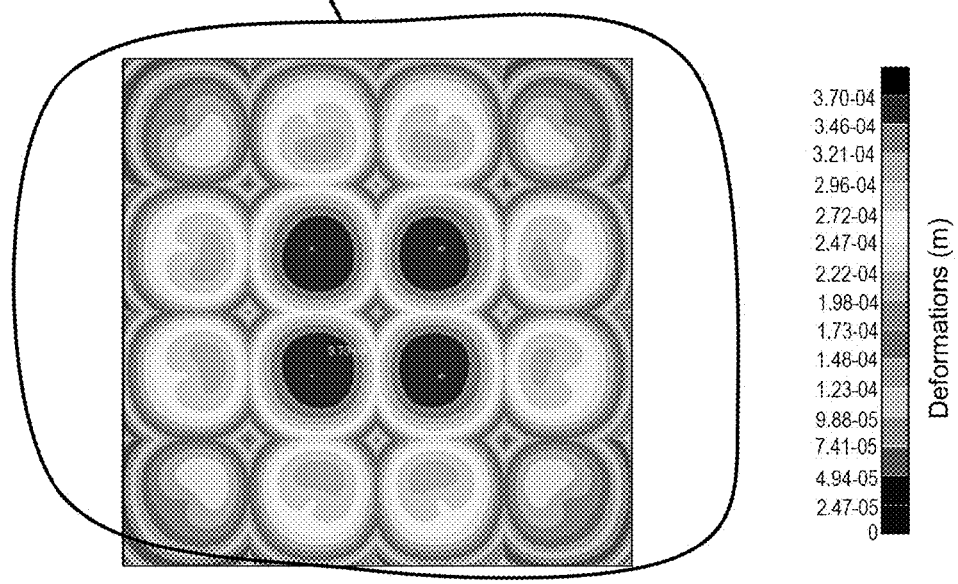

FIG. 9 represents the deformation induced in orbit in the case of transverse thermal gradient which remains the worst case (considering as reference the edge of the structural panel). The maximum deformation outside of the plane is located at the centre of the panel 1, with a controlled overall deformation, and levels of deformation on each of the elementary tiles<1 mm (that have therefore become compatible with the antenna mission).

Figure 10:
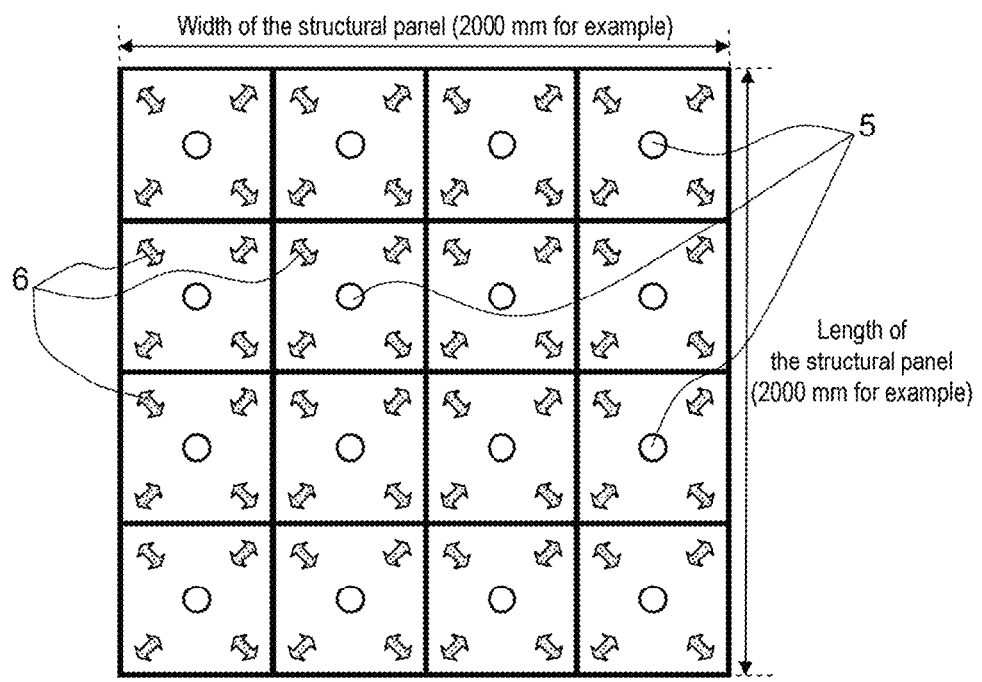
FIG. 10 represents an example of square reflect-array panel equipped with square radio frequency tiles, for example of 2 m×2 m dimensions, according to one aspect of the invention.

FIG. 10 represents an example of square panel with square tiles 3, for example of 2 m×2 m dimensions.

Figure 11:
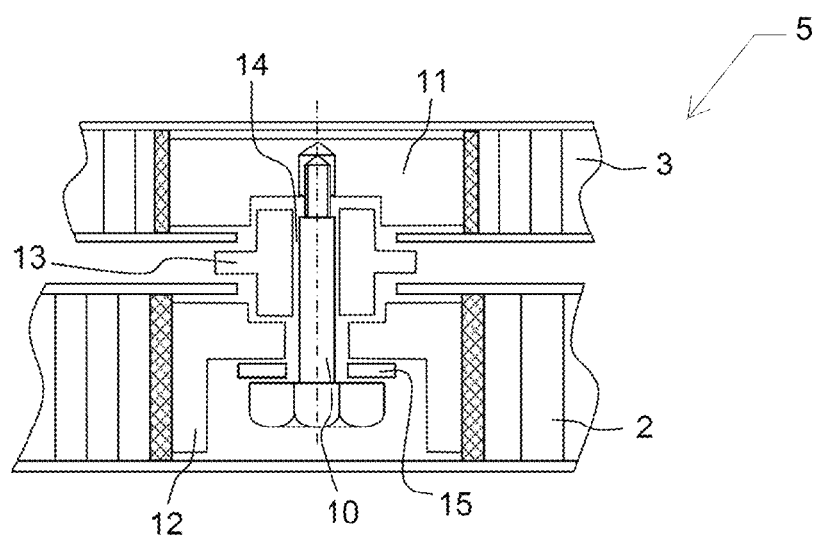
FIG. 11 schematically illustrates a complete link (also called fixed point of a radio frequency tile), according to one aspect of the invention.

FIG. 11 represents an example of complete link or fixed point 5 comprising:
- a screw 10;
- a tapped insert 11 in the radio frequency tile 3;
- a tapped insert 12 in the structural support 2;
- a shouldered spacer 13 to ensure a spacing between the radio frequency tile 3 and the structural support 2 and a centring of the elements of the complete link 5, and provided with a bore 14 for the screw 10; and
- a washer 15 between the head of the screw 10 and the insert 12 in the planar support 2.

Figure 12:
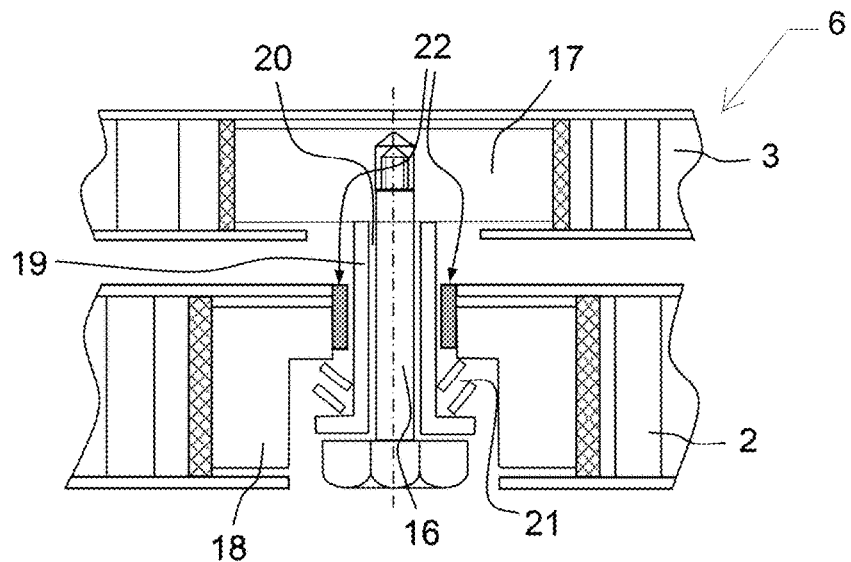
FIGS. 12, 13 and 14 schematically illustrate runner-type links, according to various aspects of the invention.

FIG. 12 represents an example of runner-type link 6 comprises:
- a screw 16;
- a tapped insert 17 in the radio frequency tile 3;
- a tapped insert 18 in the structural support 2;
- a shouldered spacer 19 ensuring a spacing between the radio frequency tile 3 and the structural support 2 and a centring of the elements of the runner-type link 6, and provided with a bore 20 for the screw 16;
- a spring washer 21 between the spacer 19 and the insert 18 in the support 2 to calibrate the effort exerted by the screw 16; and
- an oblong hole 22 allowing a sliding zone for the screw 16, between the spacer 19 and the tapped insert 18 along the axis of the runner-type link 6.

Figure 13:
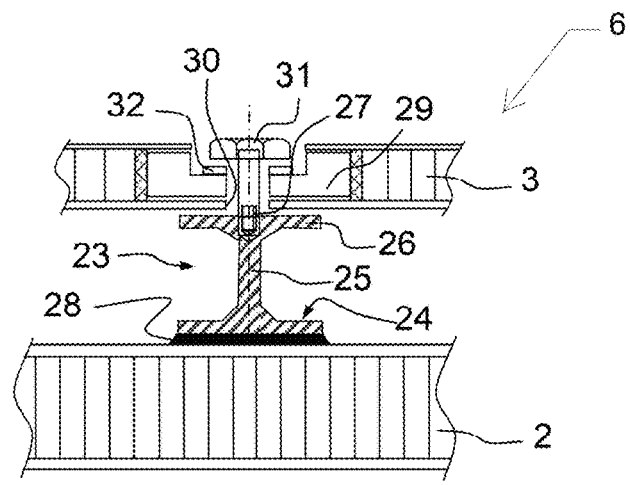

FIG. 13 represents another example of runner-type link 6 comprises:
- an "I" beam 23 ensuring a spacing between the radio frequency tile 3 and the structural support 2, comprising a bottom flange 24, a web 25 and a top flange 26 with tapping 27;
- a layer of glue 28 fixing the bottom flange 24 to the structural support 2; an insert 29 in the tile 3, with bore 30;
- a screw 31; and
- a washer 32 between the head of the screw 31 and the insert 29 in the radio frequency tile 3.

Figure 14:
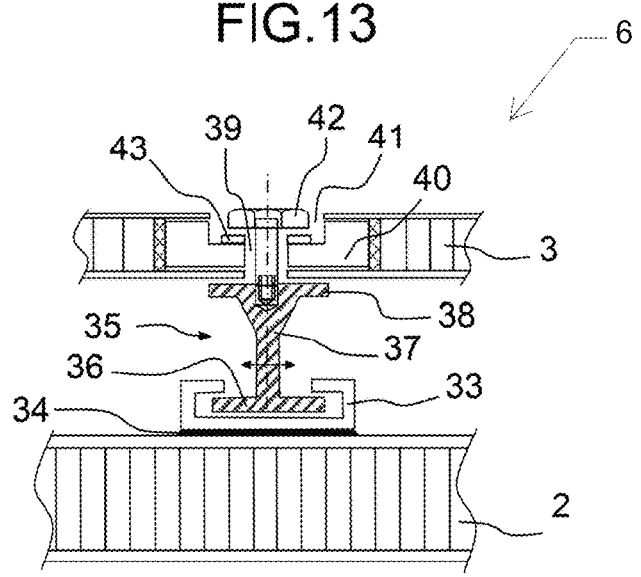

FIG. 14 represents another example of runner-type link 6 comprises:
- a runner 33;
- a layer of glue 34 fixing the runner 33 to the structural support 2;
- an "I" beam 35 ensuring a spacing between the radio frequency tile 3 and the structural support 2, comprising a bottom flange 36 forming a slide in the runner 33, a web 37 and a top flange 38 with tapping 39;
- an insert 40 in the radio frequency tile 3, with bore 41;
- a screw 42; and
- a washer 43 between the head of the screw 42 and the insert 40 in the radio frequency tile 3.

The invention is assigned to the applications of reflectarray or polarizing reflective panel type embedded on board satellites.

It makes it possible to overcome the high CTEs (coefficients of thermal expansion) that are intrinsic to the dielectric materials that are commercially available (which remain currently unavoidable for their RF properties that are imperative to the mission). The invention makes it possible to limit/constrict the deformations outside of the plane of the RF tiles in orbit, such that the necessary RF performance levels are guaranteed.

The invention claimed is:

1. A radio frequency reflective array panel for a satellite antenna, comprising:
   - a structural support;
   - one or more radio frequency tiles supporting one or more corresponding polygonal radio frequency cells configured to reflect and phase-shift incident radio frequency signals;
   - a complete link configured to provide a fixed point connection to and between the structural support and each radio frequency tile; and
   - at least two runner-type links, arranged between the structural support and each radio frequency tile, in a plane of the panel, and configured to have a distinct axes of movement passing through the complete link for each said one or more ach radio frequency tiles.

2. The panel according to claim 1, wherein said complete link is disposed at a barycenter of each radio frequency tile.

3. The panel according to claim 1, wherein said complete link is disposed at an edge of each radio frequency tile.

4. The panel according to claim 1, wherein the structural support comprises a spacer layer coated with two skins of draped orthotropic material, less than 1 mm thick, configured to ensure a quasi-isotropic equivalent Young's modulus lying between 100 and 200 GPa, and a coefficient of thermal expansion less than or equal to 3ppm/° C.

5. The panel according to claim 4, wherein the spacer layer is made of honeycomb core, and/or in a form of an assembly of bars, and/or made of foam.

6. The panel according to claim 1, wherein each of the radio frequency cells comprises a stacking of a supporting dielectric layer, covered with a stable layer that is insulating to radio frequencies within an extended range of temperatures lying between −130° C. and +150° C.

7. The panel according to claim 6, wherein the stable layer that is insulating to radio frequencies is a laminate of polyimide type, such as Kapton (registered trademark).

8. The panel, according to claim 6, wherein each of the radio frequency cells comprises a partial copper layer, ensuring a radio frequency phase-shifting, disposed between the supporting dielectric layer and the stable layer that is insulating to radio frequencies, or on the stable layer that is insulating to radio frequencies.

9. The panel according to claim 1, wherein each of the radio frequency cells have a reduced thickness of between 5 and 10 mm for implementations of a frequency band S.

10. The panel according to claim 1, wherein each complete link comprises:
    - a screw;
    - a tapped insert in the radio frequency tile;
    - a tapped insert in the structural support;
    - a shouldered spacer to ensure a spacing between the radio frequency tile and the structural support and a centering of the elements of the complete link, and provided with a bore for the screw; and
    - a washer between the head of the screw and the tapped insert in the structural support.

11. The panel according to claim 1, wherein each runner-type link comprises:
    - a screw;
    - a tapped insert in the radio frequency tile;
    - a tapped insert in the structural support;
    - a shouldered spacer ensuring a spacing between the radio frequency tile and the structural support and a centering of the elements of the runner-type link, and provided with a bore for the screw;

a spring washer between the shouldered spacer and the tapped insert in the structural support to calibrate an effort exerted by the screw; and an oblong hole allowing a sliding zone for the screw, between the shouldered spacer and the tapped insert, along the axes of movement of the runner-type link.

12. The panel according to claim 1, wherein each runner-type link comprises:
   an "I" beam ensuring a spacing between the radio frequency tile and the structural support, comprising a bottom flange, a web and a top flange with tapping;
   a layer of glue fixing the bottom flange to the structural support;
   an insert in the radio frequency tile, with bore;
   a screw; and
   a washer between a head of the screw and the insert in the radio frequency tile.

13. The panel according to claim 1, wherein each runner-type link comprises:
   a runner;
   a layer of glue fixing the runner to the structural support;
   an "I" beam ensuring a spacing between the radio frequency tile and the structural support, comprising a bottom flange forming a slide in the runner, a web and a top flange with tapping;
   an insert in the radio frequency tile, with bore;
   a screw; and
   a washer between a head of the screw and the insert in the radio frequency tile.

14. A radio frequency reflective array for satellite antenna comprising at least one panel according to claim 1, and assembly and deployment mechanisms.

* * * * *